United States Patent
Ahmadi et al.

(10) Patent No.: US 11,451,670 B2
(45) Date of Patent: Sep. 20, 2022

(54) ANOMALY DETECTION IN SS7 CONTROL NETWORK USING RECONSTRUCTIVE NEURAL NETWORKS

(71) Applicant: Oracle International Corporation, Redwood Shores, CA (US)

(72) Inventors: Hamed Ahmadi, Burnaby (CA); Ali Moharrer, Belmont, CA (US); Venkatanathan Varadarajan, Seattle, WA (US); Vaseem Akram, Noida (IN); Nishesh Rai, Rajasthan (IN); Reema Hingorani, Haryana (IN); Sanjay Jinturkar, Santa Clara, CA (US); Nipun Agarwal, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 173 days.

(21) Appl. No.: 17/123,235

(22) Filed: Dec. 16, 2020

(65) Prior Publication Data
US 2022/0191332 A1 Jun. 16, 2022

(51) Int. Cl.
*H04M 7/06* (2006.01)
*G06N 20/00* (2019.01)
(Continued)

(52) U.S. Cl.
CPC ............ *H04M 7/06* (2013.01); *G06K 9/6289* (2013.01); *G06N 20/00* (2019.01); *H04M 3/2254* (2013.01); *H04W 84/042* (2013.01)

(58) Field of Classification Search
CPC ................. H04M 7/06; H04M 3/2254; H04W 84/042; G05N 20/00; G06K 9/6289
See application file for complete search history.

(56) References Cited

U.S. PATENT DOCUMENTS

| 9,020,871 B2 | 4/2015 | Lane et al. |
| 2016/0155136 A1 | 6/2016 | Zhang et al. |

(Continued)

FOREIGN PATENT DOCUMENTS

| EP | 2 945 113 A1 | 11/2015 |
| WO | WO2017/201507 A1 | 11/2017 |

OTHER PUBLICATIONS

Haider et al., "Generating Realistic Intrusion Detection System Dataset Based on Fuzzy Qualitative Modeling", Journal of Network and Computer Applications 87 (2017) 8 pages.
(Continued)

*Primary Examiner* — Brenda H Pham
(74) *Attorney, Agent, or Firm* — Hickman Becker Bingham Ledesma LLP; Brian N. Miller

(57) ABSTRACT

Herein are machine learning (ML) techniques for unsupervised training with a corpus of signaling system 7 (SS7) messages having a diversity of called and calling parties, operation codes (opcodes) and transaction types, numbering plans and nature of address indicators, and mobile country codes and network codes. In an embodiment, a computer stores SS7 messages that are not labeled as anomalous or non-anomalous. Each SS7 message contains an opcode and other fields. For each SS7 message, the opcode of the SS7 message is stored into a respective feature vector (FV) of many FVs that are based on respective unlabeled SS7 messages. The FVs contain many distinct opcodes. Based on the FVs that contain many distinct opcodes and that are based on respective unlabeled SS7 messages, an ML model such as a reconstructive model such as an autoencoder is unsupervised trained to detect an anomalous SS7 message.

20 Claims, 7 Drawing Sheets

(51) Int. Cl.
*G06K 9/62* (2022.01)
*H04W 84/04* (2009.01)
*H04M 3/22* (2006.01)

(56) References Cited

U.S. PATENT DOCUMENTS

| | | | |
|---|---|---|---|
| 2017/0083827 | A1 | 3/2017 | Robatmili et al. |
| 2017/0161637 | A1 | 6/2017 | Misra et al. |
| 2017/0169360 | A1 | 6/2017 | Veeramachaneni et al. |
| 2018/0005676 | A1 | 1/2018 | Neil et al. |
| 2018/0096261 | A1* | 4/2018 | Chu ................... G06N 20/20 |
| 2018/0109589 | A1 | 4/2018 | Ozaki et al. |
| 2018/0330253 | A1* | 11/2018 | Gottschlich ........... G06N 20/00 |
| 2019/0197236 | A1 | 6/2019 | Niculescu-Mizil et al. |
| 2019/0370695 | A1 | 12/2019 | Chandwani et al. |
| 2020/0045049 | A1 | 2/2020 | Apostolopoulos et al. |
| 2020/0076841 | A1 | 3/2020 | Hajimirsadeghi |
| 2020/0076842 | A1 | 3/2020 | Zhou |
| 2020/0364585 | A1 | 11/2020 | Chandrashekar |
| 2021/0011832 | A1 | 1/2021 | Togawa |

OTHER PUBLICATIONS

Aggarwal et al., "Analysis of KDD Dataset Attributes—Class wise for Intrusion Detection", 3rd International Conference on Recent Trends in Computing 2015, 10 pages.
Klapper-Rybicka et al., "Unupervised Learning in LSTM Recurrent Neural Networks", dated 2001, 8 pages.
Klapper-Rybicka et al., "Unsupervised Learning in Recurrent Neural Networks", dated May 1, 2001, 11 pages.
Kiros et al., "Skip-Thought Vectors", dated 2015, 9 pages.
Kingma et al., "ADAM: A Method for Stochastic Optimization", Published as a conference paper at ICLR 2015, dated Jan. 1, 2017, 15 pages.
Kim, Yongjoon, "Chapter 10, Sequence Modeling: Recurrent and Recursive Nets", dated Apr. 1, 2016, 50 pages.
Karpathy et al., "Deep Visual-Semantic Alignments for Generating Image Descriptions", dated 2015, 10 pages.
Jensen, Kristoffer, "Improving SS7 Security Using Machine Learning Techniques", Master's Thesis, dated Jan. 6, 2016, 87 pages.
Jensen et al., "Better Protection of SS7 Networks With Machine Learning", dated 2016 IEEE, 7 pages.
Ioffe et al., "Batch Normalization: Accelerating Deep Network Training by Reducing Internal Covariate Shift", dated Mar. 2, 2015, 11 pages.
https://www.broadforward.com/, "SS7 Firewall (SS7FW)", https://www.broadforward.com/ss7-firewall-ss7fw/, dated Sep. 21, 2020, 3 pages.
Hochreiter, Sepp, "Long Short Term Memory", Nural Computation, dated Nov. 15, 1997, 46 pages.
Le et al., "Distributed Representations of Sentences and Documents", Proceedings of the 31 st International Conference on Machine Learning, Beijing, China, dated 2014, 9 pages.
Hill et al., "Learning Distributed Representations of Sentences from Unlabelled Data", dated Feb. 10, 2016, 11 pages.
Liu et al., "Detecting and Preventing Cyber Insider Threats: A Survey", IEEE Communications Survey & Tutorials, dated 2018, 21 pages.
HaddadPajouh et al, "A Two-layer Dimension Reduction and Two-tier Classification Model for Anomaly-Based Intrusion Detection in IoT Backbone Networks", dated 2016, 12 pages.
Graves et al., "Speech Recognition With Deep Recurrent Neural Networks", dated Mar. 22, 2013, 5 pages.
Gogoi, et al., "Packet and Flow Based Network Intrusion Dataset", dated 2012, 12 pages.
Ghosh et al., "Detecting Anomalous and Unknown Intrusions Against Programs", dated 1998, 9 pages.
Du et al. DeepLog: Anomaly Detection and Diagnosis from System Logs through Deep Learning, CCS'17, Oct. 30-Nov. 3, 2017, 14 pages.

Dai et al., "Semi-supervised Sequence Learning", dated 2015, 9 pages.
Conneau et al. "Supervised Learning of Universal Sentence Representations from Natural Language Inference Data", Dated Jul. 21, 2017, 12 pages.
Cellusys, "SS7 Vulnerabilities", dated 2015, 53 pages.
Buczak et al., "A Survey of Data Mining and Machine Learning Methods for Cyber Security Intrusion Detection", IEEE Communications Surveys & Tutorials, vol. 18, No. 2, Second Quarter 2016, 24 pages.
Bontemps et al., "Collective Anomaly Detection based on Long Short Term Memory Recurrent Neural Network", dated 2016, 12 pages.
Berlin et al., "Malicious Behavior Detection using Windows Audit Logs", dated Aug. 25, 2015, 10 pages.
Bengio et al., "A Neural Probabilistic Language Model", Journal of Machine Learning Research 3, dated Feb. 2003, 19 pages.
Hinton et al., "Neural Networks for Machine Learning", Lecture Overview of mini-batch gradient descent, dated 2012, 31 pages.
Positive Technologies, "SS7 Vulnerabilities in the Spotlight", dated Mar. 5, 2018, https://positive-tech.com/knowledge-base/research/ss7-vulnerability-2018/, 34 pages.
Yousefi-Azar et al., "Autoencoder-based Feature Learning for Cyber Security Applications", dated 2017, 8 pages.
Usama et al., "Unsupervised Machine Learning for Networking: Techniques, Applications and Research Challenges", dated Sep. 19, 2017, 37 pages.
Ullah et al., "SS7 Vulnerabilities—A Survey and Implementation of Machine Learning vs Rule Based Filtering for Detection of SS7 Network Attacks", IEEE, vol. 22, No. 2, dated Feb. 5, 2020, 35 page.
UFLDL Tutorial, "Autoencoders", http://ufldl.stanford.edu/tutorial/unsupervised/Autoencoders/, dated Sep. 21, 2020, 5 pages.
Tuor et al., "Deep Learning for Unsupervised Insider Threat Detection in Structured Cybersecurity Data Streams", dated Dec. 15, 2017, 9 pages.
Sutskever et al., "Sequence to Sequence Learning with Neural Networks", dated 2014, 9 pages.
Srivastava et al., "Dropout: A Simple Way to Prevent Neural Networks from Overfitting", Journal of Machine Learning Research 15, dated Jun. 2014, 30 pages.
Shiravi et al., "Toward Developing a Systematic Approach to Generate Benchmark Datasets for Intrusion Detection", dated Feb. 28, 2011, 18 pages.
Shipmon et al., "Time Series Anomaly Detection", Detection of Anomalous Drops with Limited Features and Sparse Examples in Noisy Highly Periodic Data, dated 2017, 9 pages.
Seleznyov et al., "Anomaly Intrusion Detection Systems: Handling Temporal Relations between Events", dated 1999, 12 pages.
Ruder, Sebastian, "An Overview of Gradient Descent Optimization Algorithms", dated Jun. 15, 2017, 14 pages.
Ruber, Sebastian, "An overview of gradient descent optimization algorithms", dated Jan. 19, 2016, https://ruder.io/optimizing-gradient-descent/index.html, 32 pages.
Kolosnjaji et al., "Deep Learning for Classification of Malware System Call Sequences", dated 2016, 12 pages.
Puzankov, Sergey, "Attacks You Can't Combat: Vulnerabilities of Most Robust Mobile Operators", Positive Technologies, dated 2018, 51 pages.
YuanZhong, Zhu, "Intrusion Detection Method based on Improved BP Neural Network Research", International Journal of Security and Its Applications vol. 10, No. 5 (2016) pp. 193-202.
Positive Technologies, "Primary Security Threats for SS7 Cellular Networks", dated 2016, 16 pages.
P1 Security, "SS7map: SS7 Country Risk Ratings", https://labs.p1sec.com/2014/12/28/ss7map-country-risk-ratings/, dated Dec. 28, 2014, 9 pages.
Mourad, Hassan, "The Fall of SS7 How Can the Critical Security Controls Help?", SANS Institute Information Security Reading Room, dated 2015, 29 pages.
Mnih et al., "A Scalable Hierarchical Distributed Language Model", dated 2009, 8 pages.

(56) References Cited

OTHER PUBLICATIONS

Mirza Ali H et al., "Computer Network Intrusion Detection Using Sequwnrial LSTM Neural Networks Autoencoders", dated May 2, 2018, 2018 26th Signal Processing and Communicaitons Applications Con. 4 pgs.
Mikolov, Tomas, "Recurrent Neural Network Based Language Model", dated Jul. 20, 2010, 24 pages.
Mikolov et al., "Efficient Estimation of Word Representations in Vector Space", dated Sep. 7, 2013, 12 pages.
Mikolov et al., "Distributed Representations of Words and Phrases and their Compositionality", dated 2013, 9 pages.
Malhotra et al., "LSTM-based Encoder-Decoder for Multi-sensor Anomaly Detection", Presented at ICML 2016 Anomaly Detection Workshop, New York, NY, USA, 2016. Copyright 2016, 5 pages.
Malhotra et al., "Long Short Term Memory Networks for Anomaly Detection in Time Series", Esann dated Apr. 22, 2015 proceedings, European Symposium on Artificial Neural Networks, 6 pages.
Luo et al., "A Revisit of Sparse Coding Based Anomaly Detection in Stacked RNN Framework", dated Oct. 2017, 9 pages.
Loganathan et al., "Sequence to Sequence Pattern Learning Algorithm for Real-time Anomaly Detection in Network Traffic", conference paper dated May 2018, 4 pages.
Qasim et al., "Detection of Signaling System 7 Attack in Network Function Virtualization using Machine Learning", dated Jan. 2018, 6 pages.
L. Bernardi, "Don't be tricked by the Hashing Trick", available: https://booking.ai/dont-be-tricked-by-the-hashing-trick-192a6aae3087, retrieved Jan. 13, 2021, 13 pages.
Hajimirsadeghi, U.S. Appl. No. 16/122,505, filed Sep. 5, 2018, Office Action, dated May 13, 2021.
Jubatus, "Data Conversion" http://jubat.us/en/fv_convert.html, last viewed on May 20, 2019, 27 pages.
Bengio et al., "Learning Long-Term Dependencies with Gradient Descent is Diffucult", IEEE Transactions on Neural Networks, vol. 5, No. 2, dated Mar. 1994, 10 pages.
Bishop et al., "Exact Calculation of the Hessian Matrix for the Multi-layer Perceptron", Published in Neural Computation 4 No. 4.dated 1992, 8 pages.

Bolon-Canedo V et al., "Distributed Feature Selection: An Application to Microarray Data Classification", Applied Soft Computing, vol. 30, dated Feb. 7, 2015, pp. 136-150.
Buitinck et al., "API design for machine learning software: experiences from the scikit-learn project", dated Sep. 2013, 15 pages.
Cao et al., "Collective Anomaly Detection Based on Long Short Term Memory Recurrent Neural Network", dated Mar. 2017, 13 pages.
Data Science, "How does one go about feature extraction for training labelled tweets for sentiment analysis?", https://datascience.stackexchange.com/questions/30516, last viewed on May 20, 2019, 10 pgs.
Godin et al. Improving Language Modeling using Densely Connected Recurrent Neural Networks, dated Jul. 19, 2017, 5 pages.
Bengio et al., "Conditional Computation in Neural Networks for Faster Models", ICLR 2016, dated Jan. 7, 2016, 12 pages.
Huang et al., "Deep Networks with Stochastic Depth", dated 2016, 16 pages.
Xu, Wei, "System Problem Detection by Mining Console Logs", Technical Report No. UCB/EECS-2010-112, dated Aug. 1, 2010, 110 pages.
Moran-Fernandez L et al., "Centralized Vs. Distributed Feature Selection Methods Based on Data Complexity Measures", Knowledge-Based Systems, vol. 117 dated Sep. 28, 2016, pp. 27-45.
Nandan et al., "Fast SVM Training Using Approximate Extreme Points", Journal of Machine Learning Research 15 dated 2014, pp. 59-98.
Piad-Morffis et al., "A Neural Network Component for Knowledge-Based Semantic Representations of Text",Recent Advances in Natural Language Processing, dated Sep. 2019, pp. 904-911.
Pradsad Bakshi Rohit et al., "Distributed Feature Selection Using Vertical Partitioning for High Dimensional Data", dated Sep. 21, 2016, IEEE, pp. 807-813.
Radford et al., "Network Traffic Anomaly Detection Using Recurrent Neural Networks", dated Mar. 2018, 8 pages.
Sarkar, Dipanjan, "Continous Numeric Data, Towards Data Science", dated Jan. 4, 2018, 28 pages.
Srivastava et al. "Highway Networks", dated Nov. 2015, 6 pages.
He et al., "Deep Residual Learning for Image Recognition", IEEE, dated 2016, 9 pages.

* cited by examiner

201 Store signaling system 7 (SS7) messages that are not labeled as anomalous and contain diverse operation codes 202 For each SS7 message, store respective operation code into respective feature vector 203 Based on feature vectors that contain diverse operation codes, unsupervised train machine learning (ML) model to detect anomalous SS7 message

ANOMALY DETECTION IN SS7 CONTROL NETWORK USING RECONSTRUCTIVE NEURAL NETWORKS

FIELD OF THE INVENTION

The present invention relates to reconstructive models such as an autoencoder for intrusion detection. Herein are machine learning techniques for unsupervised training with a corpus of signaling system 7 (SS7) messages having a diversity of called and calling parties, operation codes and transaction types, numbering plans and nature of address indicators, and mobile country codes and network codes.

BACKGROUND

Telephony control network traffic grows exponentially as the number of telecommunication networks increases and more people use cellphones. With the advent of fifth generation (5G) networks, bandwidth increases significantly which encourages creation of more complicated applications with more sophisticated malicious intrusion vulnerabilities. In a 5G environment, anything less than an automated intelligent system that can handle a huge volume of data would be impractical and adversely affect the success and reputation of a network operator.

The Signaling System No. 7 (SS7) protocol suite is used in telecommunication technologies for signaling and management of communication. When SS7 was developed in 1975, few network operators existed due to regulatory monopolies and operator network access was limited, which needed only minimal network security that has not kept pace with the evolution of various modern vulnerabilities. There are many industrial and academic efforts to identify SS7 attacks using rule-based systems. However due to inflexibility, such systems are known to underperform for slightly more sophisticated types of attacks. Attempts to utilize machine learning for intrusion detection were limited to SS7 messages for one user of interest or one operation code.

SS7 may interconnect various network operators and other parties for telephone calls between network operators, especially for roaming of mobile phones. Recent reports have announced major vulnerabilities in the SS7 protocol suite that threatens user privacy and can lead to user location tracking, fraud, denial of service, or call interception. There is a cartography of SS7 International Roaming Infrastructure vulnerabilities based on privacy leaks, network exposure, and global risk which reveals a world-wide problem that occur even in developed countries with more advanced technologies.

Most anomaly detection models are rule-based. Rules imply blacklisting or whitelisting of various events. A sore limitation of rule-based models is an inability to detect unforeseen events, such as new types of attacks. Moreover, rule-based models require deep knowledge of the domain, demand much manual work, and are time consuming to generate for a complex system such as log analysis.

Currently, the industry uses rule-based firewalls to monitor, develop rules, and implement policies to stop or limit the impact of attacks as the only way to secure a network and subscribers. Firewalls try to cover three general categories of attacks, but penetration test results show that firewalls work well only for the one most basic category. Intrusion success rates of the other two categories of attacks is over 70% in top operators employing such firewalls. Furthermore, there are more complicated attacks that do not fall into these categories, and new attack patterns may continue to arise and evolve.

DETAILED DESCRIPTION

Figure 1:
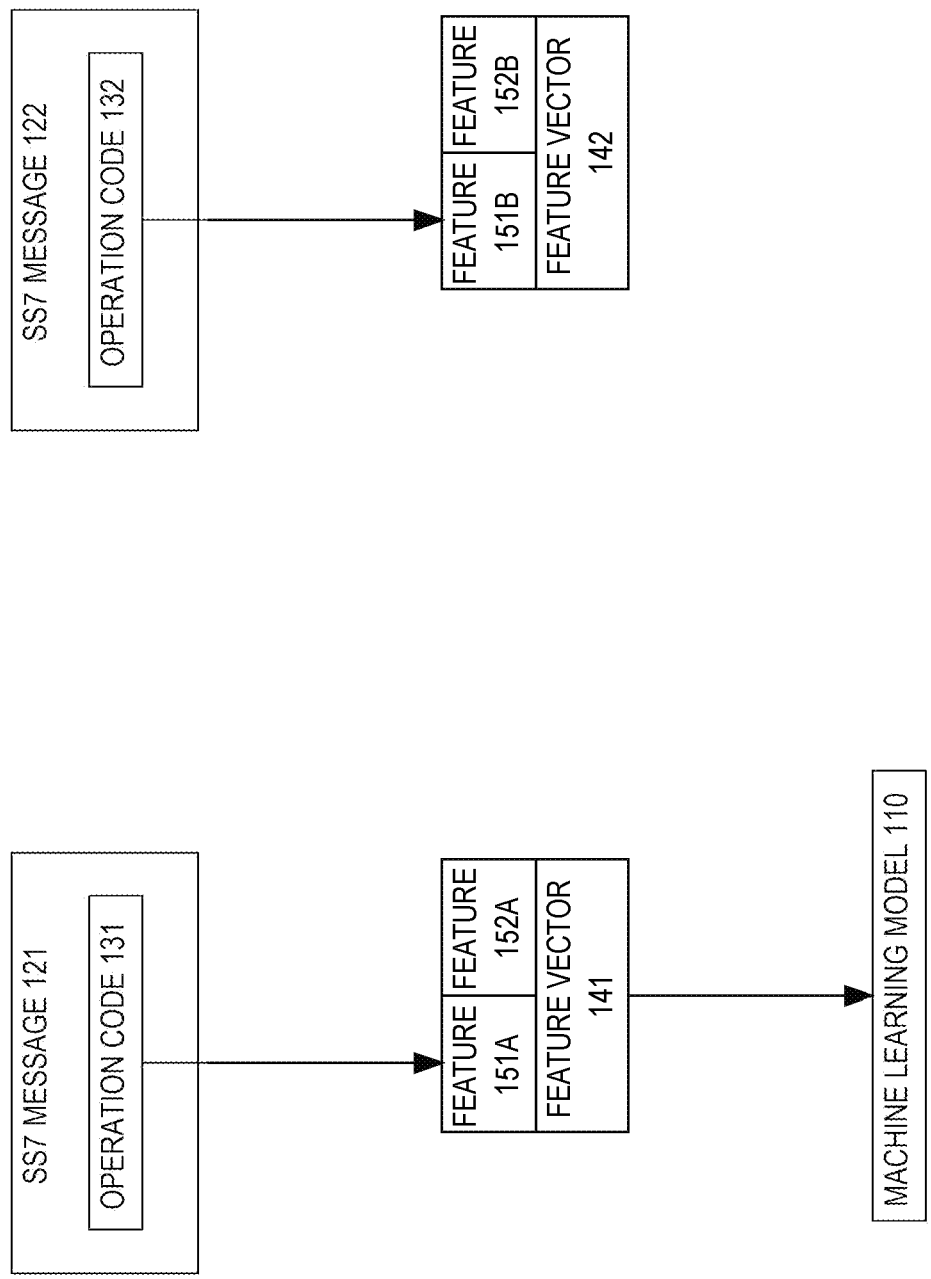
FIG. 1 is a block diagram that depicts an example computer that applies machine learning (ML) techniques for unsupervised training with a corpus of signaling system 7 (SS7) messages having a diversity of called and calling parties, operation codes and transaction types, numbering plans and nature of address indicators, and/or mobile country codes and network codes.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Models powered by machine learning (ML) are an attractive alternative to rule-based approaches. However, it is not obvious which combination of features, encoding, models, and parameters would best work for a given security task. Instead of specifying a list of predefined rules, unsupervised ML models herein learn the distribution of the normal signaling system 7 (SS7) control-traffic data, which is then used to identify anomalies.

Here is a novel approach to detect anomalies, including attacks and other problematic activities, in SS7 traffic data. In an embodiment, a deep reconstructive neural network may be trained and then deployed into a network stack to analyze control-traffic for all users (called and calling) and operation codes. Unsupervised training herein fits a diversity of transaction types, numbering plans, and nature of address indicators that have an important role in detecting attacks.

Techniques herein extract fields and other features out of SS7 network traffic data and unsupervised train a reconstructive neural network to model the normal behavior. The idea is that anomalous SS7 messages include more irregularities and should be harder to reconstruct relative to normal messages. Thus, magnitude of reconstruction error may determine how anomalous an SS7 message is without needing decision rules or training labels.

Unlike ML academic attempts, techniques herein are not limited to a user of interest or an operation code. Herein, all types of SS7 messages with different called and calling parties, operation codes, transaction types, numbering plans, nature of address indicators, mobile country codes, and mobile network codes are automatically handled and thoroughly scrutinized. ML models herein learn normal behavior per network operator and adapt to any proprietary mix of SS7 control-traffic.

For example in 2019, the Global System for Mobile Communications (GSMA) released the latest guidelines for "SS7 Interconnect Security" (FS.11) which defines the following three attack categories that are all well-handled only by ML models herein:

Category 1: Messages that should only be received from within the same network and/or are unauthorized at interconnect level and should not be sent between operators unless there is an explicit bilateral agreement.

Category 2: Messages that should only be received from a visiting subscriber's home network. These should normally only be received from an inbound roamer's home network and require intra-packet logic to be applied to detect anomalies on packets either inbound or outbound.

Category 3: Messages that should only be received from the subscriber's visited network. Specifically, mobile application part (MAP) packets that are authorized to be sent on interconnects between mobile operators. These may need additional, advanced inter-packet sensitivity to detect anomalies.

In an embodiment, a computer stores SS7 messages that are not labeled as anomalous or non-anomalous. Each SS7 message contains an operation code and other fields. For each SS7 message, the operation code of the SS7 message is stored into a respective feature vector of many feature vectors that are based on respective SS7 messages that are not labeled as anomalous or non-anomalous. The feature vectors contain many distinct operation codes. Based on the feature vectors that contain many distinct operation codes and that are based on respective SS7 messages that are not labeled as anomalous or non-anomalous, an ML model is unsupervised trained to detect an anomalous SS7 message. In an embodiment, the ML model is a reconstructive model such as an autoencoder.

1.0 Example Computer

FIG. 1 is a block diagram that depicts an example computer 100, in an embodiment. Computer 100 hosts machine learning (ML) model 110 for anomaly detection such as intrusion detection. Computer 100 applies ML techniques for unsupervised training with a corpus of signaling system 7 (SS7) messages 121-122 having, as explained later herein, a diversity of called and calling parties, operation codes 131-132 and transaction types, numbering plans and nature of address indicators, and/or mobile country codes and network codes.

Computer 100 may be one or more of a rack server such as a blade, a personal computer, a mainframe, a virtual computer, or other computing device. In memory, computer 100 stores untrained ML model 110 that may or may not be a reconstructive model, such as an autoencoder as discussed later herein. ML model 110 processes a representation of an SS7 message as a complex input to generate an inference such as a prediction or classification. A reconstructive model more or less accurately regenerates its input, which includes features 151-152 that may have various respective values such as shown feature values 151A-B and 152A-B.

Input reconstruction may have different purposes at different phases in the lifecycle of ML model 110 as follows. ML model 110's lifecycle has two phases, which are laboratory training followed by production inferencing. Learning occurs during training, which input reconstruction may improve. Learning may entail internal adjustment of ML model 110 based on measured error of model inferences.

1.1 Autoencoder

In an embodiment, ML model 110 is an autoencoder. Backpropagation training of an artificial neural network (ANN) such as an autoencoder as discussed later herein may be driven by model error. With supervised training, model error may be measured by comparing an inference by an ML model to a predefined label that is already established as the correct inference. With unsupervised training, such as with an autoencoder, predefined labels may be unavailable, and error may instead be measured based on diagnostic output from the autoencoder as follows.

In an embodiment, an autoencoder may be a multilayer perceptron (MLP) that generally provides dimensionality reduction, regardless of whether the autoencoder is used for classification or anomaly detection. As discussed above, classification entails associating an inferred label with a complex input. In other words, classification entails recognizing a learned pattern. Anomaly detection does the opposite, which is recognizing that an input such as an SS7 message does not match any learned pattern.

In any case, an autoencoder provides dimensionality reduction, which: a) entails avoiding analysis and integration of irrelevant features of an input, and b) generating a more concise internal neural representation of the input in which only meaningful input features are retained. In other words, an autoencoder extracts semantic details of a complex, noisy, and fuzzy input. Thus, the autoencoder converts a sparse representation of an input into a dense encoding. Features and feature representation are discussed later herein.

Generally during training, an autoencoder learns which features should be deemphasized and how to encode retained semantic features. An autoencoder herein further is a reconstructive model because the autoencoder contains additional neural layers that are trained to regenerate the original input. In other words, the autoencoder encodes input into a semantic coding, which the autoencoder further decodes back into a more or less accurate copy of the input.

An autoencoder may have various neural layers or subsets of layers that perform learned activity of a dedicated nature as follows. An input layer may be specialized for encoding input features. An output layer may be specialized for summarizing analytic results.

Layers such as a hidden layer or an activation layer may be specialized for semantic analysis as needed for learned fitness of indirectly connecting input layers to output layers. A batch normalization layer may normalize values conducted within the autoencoder to have a predefined range even though different training batches naturally have somewhat different value ranges and scales. A dropout layer may be a further specialization of another layer to prevent overfitting such that the dropout layer can be selectively (e.g. probabilistically) engaged or bypassed such as per batch.

Depending on the embodiment, some kinds of layers may be segregated such that adjacent layers are usually of a same kind. Depending on the embodiment, different kinds of layers may be interleaved in a repeating pattern such as every third layer being a dropout layer. Various embodiments may or may not contain at least three adjacent or non-adjacent layers of a same kind. In various embodiments, those three layers of a same kind are of a kind such as hidden, batch normalization, activation, or dropout.

In an embodiment, ML model 110 instead is a principal component analysis (PCA). Although operationally very different from an autoencoder, PCA is a reconstructive model that is functionally similar to an autoencoder as follows. Like an autoencoder, PCA undergoes unsupervised training to learn dimensionality reduction and minimize reconstruction error. Architectures of PCA and autoencoders are discussed later herein.

1.2 Reconstruction Error

A measured difference between the original input and the regenerated input is referred to as reconstruction error. Because the original input and the regenerated input are composed of individual features 151-152, a difference may be measured between an original feature and a reconstructed feature to calculate a respective reconstruction error for that feature. In other words, a respective reconstruction error may be measured for each of features 151-152.

Integration such as by summation, mean, or maximum of respective reconstruction errors of all features 151-152 may be used to calculate a loss that measures how much relevant information did ML model 110 lose when inferencing for an input such as SS7 message 121. As discussed below, loss may indicate reconstruction error that occurs in a regenerated input as compared to the original input. Loss is informally or mathematically the opposite of inference accuracy. That is, the higher is loss, the less reliably did ML model 110 recognize an input. For anomaly detection, high loss, such as exceeding a threshold, may indicate that the input is anomalous, in which case the SS7 message that the input represents also is anomalous or suspicious.

When ML model 110 is used for classification such as anomaly detection, reconstruction error may be used as a proxy for inference error. Such use of reconstruction error is especially important for unsupervised learning because, without predefined labels, inference error may be more or less impossible to measure. Thus reconstruction error, instead of inference error, may be used for unsupervised learning by a reconstructive model such as for backpropagation for unsupervised training of an autoencoder.

1.3 Anomaly Detection

As mentioned above, training is not the only lifecycle phase of an ML model, and learning is not the only purpose of input reconstruction. The two lifecycle phases of laboratory training and production inferencing are rigid such that all machine learning occurs in the training environment, and no learning occurs in the production environment.

As explained above, anomaly detection entails recognizing that a complex input matches no learned pattern. In other words, anomaly detection entails recognizing unfamiliarity, which has the following implications.

Accurate input reconstruction is eventually achieved during training. Without training, accurate reconstruction is impossible, in which case reconstruction error is high. By definition, an unfamiliar input is any input that ML model 110 was not trained for. Thus an unfamiliar input in a production environment necessarily causes a high reconstruction error.

In a production environment, an unfamiliar input is an anomaly, which is detectable due to its high reconstruction error. Thus, ML model 110 detects an anomaly when a reconstruction error exceeds an anomaly threshold.

1.4 Input Features

As discussed earlier herein, a respective reconstruction error is separately measured for each individual feature 151-152 for an SS7 message. Although presented as an empirically observed measurement, reconstruction error actually is calculated by a respective error function for each individual feature 151-152. In an embodiment, each error function accepts two arguments and returns one scalar result. The arguments are: the reconstructed value of a feature, and the original value such as 151A of the same feature as actually provided in the current input such as feature vector 141 that represents SS7 message 121.

Each of SS7 messages 121-122 is represented as a complex input that is generated as a respective feature vector 141-142 that contains a respective value for each of all features 151-152. Some or all fields or other aspects of SS7 message 121 provide respective feature values 151A and 152A that are encoded and stored into feature vector 141 as follows.

For example, respective values of feature 151 are shown as feature values 151A-B in respective feature vectors 141-142. In an embodiment, feature vector 141 is homogenous such that respective values of all features 151-152 are encoded as a same datatype such as a same primitive datatype such as an integer or a unit normalized real number such as floating point. In an embodiment, feature vector 141 is heterogenous such that each feature may have its own respective datatype.

In an embodiment, a sequential feature such as a calendar month may be encoded as a zero or one based unsigned integer such as 1-12 instead of as text strings such as January. In an embodiment, categorical features such as a feature of unordered and mutually exclusive choices such as tea flavors may be so-called one-hot encoded as a group of mutually exclusive Boolean features. For example, one choice from three flavors may be encoded into three Boolean features in which the corresponding feature is true and the two other Boolean features are false in the feature vector.

If possible values of a categorical feature are not mutually exclusive, such as when the feature may simultaneously have values C-D (not shown) in a same feature vector, then N-hot encoding may be used. For example, two choices from three tea flavors may be encoded into three Boolean features in which the corresponding two features are true and the one other Boolean feature is false in the feature vector. In an embodiment, a Boolean feature is encoded as a number.

The implementation of a feature's error function compares the original and reconstructed values of the feature to calculate a numeric score that measures a magnitude of a difference between the original and reconstructed values of the feature. In various embodiments, respective error functions of different features each returns a reconstruction error in a same or different numeric range that is respectively normalized or not. For example, some or all error functions may return a real number in the range of 0-1 where zero means perfect reconstruction of an exact match and one means that the reconstruction bears no resemblance to the original value. Here error is, mathematically or informally, the opposite of accuracy.

1.5 Signaling System 7 (SS7)

Technically, an SS7 message is a message signal unit (MSU) for telephone call control within a communication network or between multiple communication networks. SS7 messages 121-122 consist of data fields, some of which may or may not be common to many or all SS7 messages. Each field consists of a few bits or bytes, and SS7 messages 121-122 consist of respective limited amounts of bytes.

SS7 messages are categorized by protocol such as mobile application part (MAP) that controls cellular mobility such as roaming and short message service (SMS). Different SS7 protocols may provide various operations and define or redefine various one-byte operation codes respectively for those operations. Each of messages 121-122 contains a respective operation code 131-132 that may or may not have different values. Because techniques herein accommodate a diversity of operation codes, discussion herein demonstratively assumes that operation codes 131-132 are distinct values.

Each of some or all fields of SS7 message 121 are encoded as values of respective features that are stored into feature vector 141. For example, operation code 131 is encoded as feature value 151A. Although not shown, SS7 message 121 contains other fields that are also stored into feature vector 141 such as feature value 152A.

For example as discussed later herein, SS7 messages 121-122 may contain fields for called and calling parties, transaction types, numbering plans and nature of address indicators, and/or mobile country codes and network codes. In other words, feature vector 141 is a complete or partial representation of SS7 message 121 in a format that ML model 110 accepts as input for inferencing. MAP operation codes are enumerated in the Mobile Application Part (MAP) specification, part no. ETSI TS 100 974 V6.11.0.

2.0 Unsupervised Training Process

Figure 2:
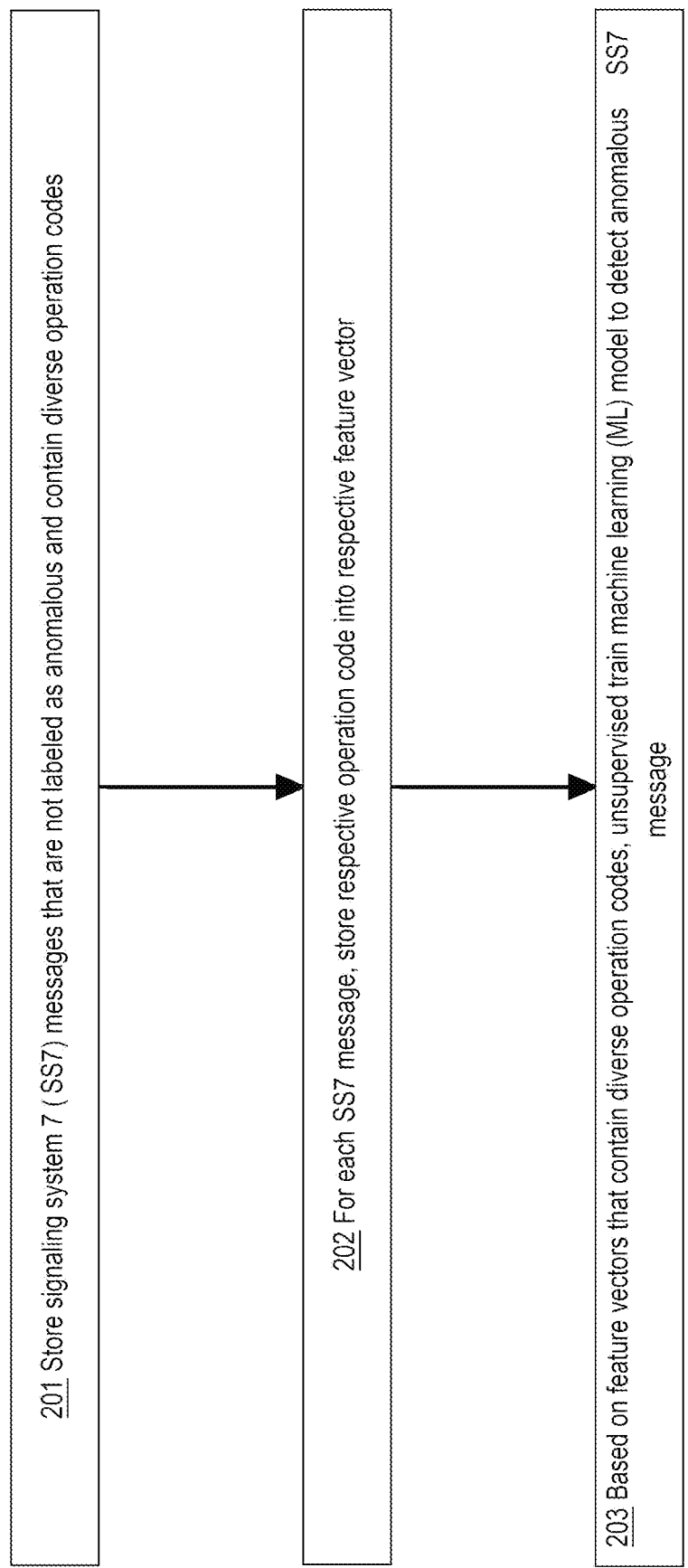
FIG. 2 is a flow diagram that depicts an example computer process for unsupervised training with a corpus of SS7 messages having a diversity of called and calling parties, operation codes and transaction types, numbering plans and nature of address indicators, and/or mobile country codes and network codes.

FIG. 2 is a flow diagram that depicts an example process that computer 100 may perform for unsupervised training of machine learning (ML) model 110 with a corpus of signaling system 7 (SS7) messages 121-122 having, as explained later herein, a diversity of called and calling parties, operation codes 131-132 and transaction types, numbering plans and nature of address indicators, and/or mobile country codes and network codes. FIG. 2 is discussed with reference to FIG. 1.

Step 201 generates a training corpus by storing SS7 messages that are not labeled as anomalous and that contain diverse respective operation codes. For example, SS7 messages 121-122 may be stored as respective records in a database, file, or volatile memory. Stored SS7 messages 121-122 are raw and wild because they are unlabeled and unclassified as to whether each SS7 message respectively is anomalous or not, suspicious or not, and malicious or not. In other words before training ML model 110, neither computer 100 nor its human operators know which of SS7 messages 121-122 are anomalous and which are non-anomalous. Thus, supervised training is impossible.

Step 202 encodes and stores some or all fields of SS7 messages 121-122 into respective features of respective feature vectors 141-142. For example, fields of SS7 message 121 are encoded as feature values 151A and 152A that are stored into feature vector 141. For example, operation code 131 is encoded and stored as feature value 151A.

Based on feature vectors 141-142 that contain diverse respective operation codes, step 203 unsupervised trains ML model 110 to detect which SS7 messages 121-122 are anomalous and which are non-anomalous. For example, training step 203 may configure ML model 110 for detecting whether SS7 message 121 is anomalous or non-anomalous. Unsupervised training techniques such as backpropagation in an autoencoder are discussed later herein.

Step 203 differs from known training techniques for SS7 anomaly detection that are supervised or cannot handle a diversity of values in important fields such as called and calling parties, operation codes 131-132 and transaction types, numbering plans and nature of address indicators, and/or mobile country codes and network codes. In other words, known techniques need training labels and/or a training corpus with a very narrow range of value(s) for some or all of those important SS7 fields. Thus, known techniques need highly curated training data, whereas step 203 accepts wild SS7 messages for training such as a naturally occurring log of SS7 control-traffic or a random mix of SS7 control-traffic from different communication networks at different times.

3.0 Feature Vector Operation

Figure 3:
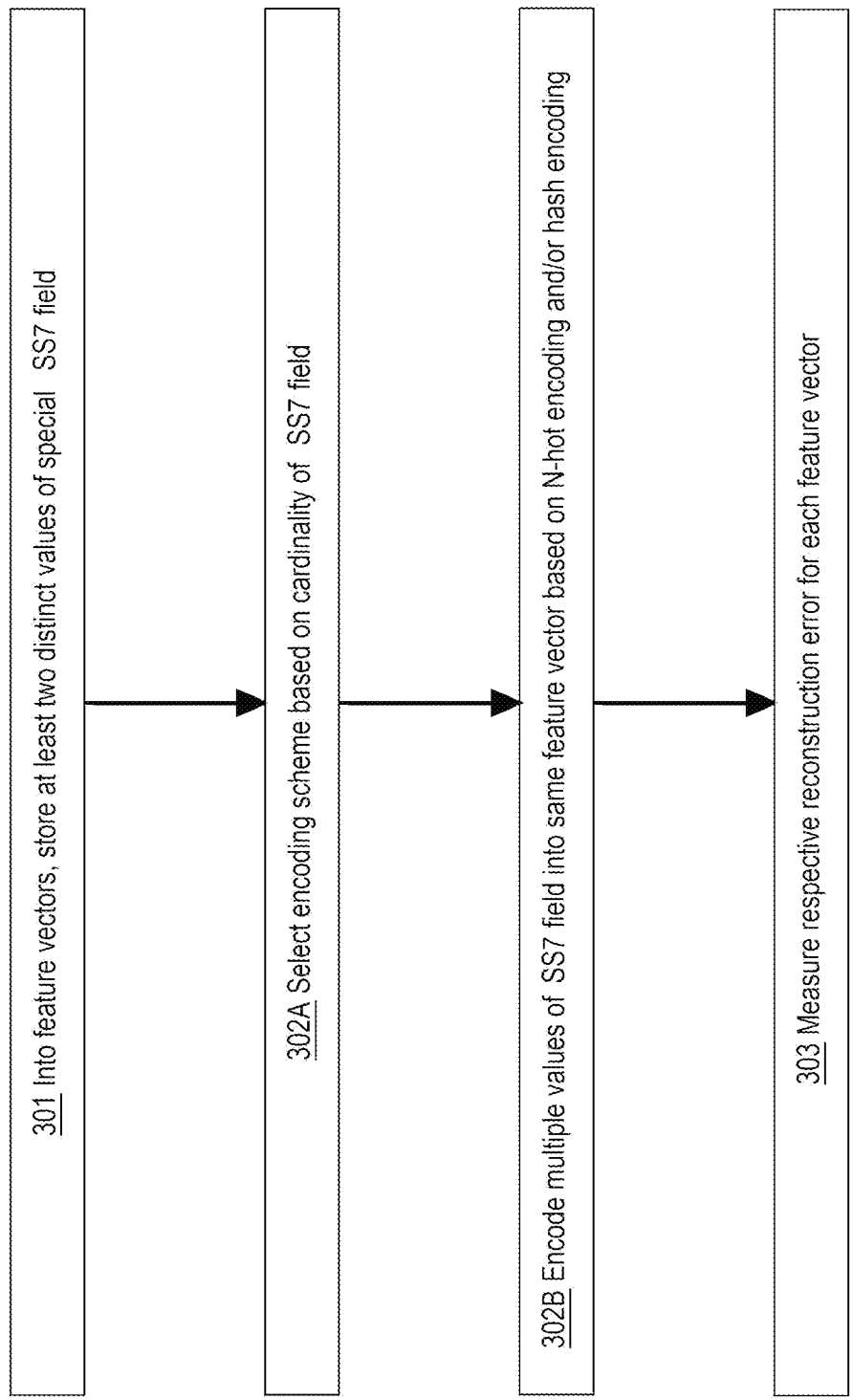
FIG. 3 is a flow diagram that depicts an example computer process for operation of SS7 feature vectors.

FIG. 3 is a flow diagram that depicts an example process for operation of SS7 feature vectors by a computer such as computer 100.

Into multiple feature vectors, step 301 stores at least two distinct values of a same special SS7 field. That is, two feature vectors contain different respective values for the same special SS7 field. Thus, training is based on a diversity of values for that field. For step 301 in various embodiments, at least one, at least two, or at least three of the following SS7 fields are special. In various embodiments, many, most, or all of the following SS7 fields are special:

origin point code (OPC)
    destination point code (DPC)
    called transaction type (CDTT)
    called numbering plan (CDNP)
    called nature of address indicator (CDNAI)
    called address (CDADDR)
    called country name (CDCN)
    called geolocation (CDLOC)
    calling transaction type (CGTT)
    calling numbering plan (CGNP)
    calling nature of address indicator (CGNAI)
    calling address (CGADDR)
    calling country name (CGCN)
    calling geolocation (CGLOC)
    calling transaction type (CGTT)
    link set (LSET)
    connectionless service function (CLSF)

SS7 fields have various respective datatypes, value ranges, and native SS7 widths in bits or bytes. Some SS7 fields are optional such that an SS7 field may have one or no occurrences of a value. Some SS7 fields occur in variable amounts such that an SS7 may have none, one, or multiple occurrences of respective value(s).

As follows, steps 302A-B may cooperate in some scenarios to encode an SS7 field based on how many possible values could the field have, even if the field should only have one actual value. Cardinality is a count of how many possible values could a same SS7 field have across a population of multiple SS7 messages. In other words, cardinality measures how broad is the range of possible values for the field.

Step 302A selects an encoding scheme for an SS7 field based on the cardinality of the field. That is, there may be different ways to encode a same SS7 field as feature value(s) in a feature vector. For example, step 302A may select one encoding scheme if the field's cardinality exceeds a threshold and otherwise select another encoding scheme.

Based on N-hot encoding and/or hash encoding, step 302B encodes multiple values of a same SS7 field into a same feature vector. As described earlier herein, 1-hot and N-hot encodings are sparse representations that do not scale well because each possible value of a same field is individually encoded and stored as a separate feature value with separate storage in a same feature vector. For example with 1-hot or 2-hot encoding, picking respectively only one or two tea flavors from a menu of fifty flavors entails storing fifty Booleans as fifty separate feature values into the feature vector, which wastes space.

As explained above, 1-hot and N-hot encodings are sparse because feature count scales with the range size of possible values. Hash encoding is instead dense by limiting related feature count regardless of range size of possible values. For example, a range of fifty possible values may be hashed into twenty Boolean or integer features, which achieves compression.

With hash encoding, a hash function maps an unencoded feature value to a respective one of the Boolean or integer features. For example, the hash function may return an offset of 0-19 into a Boolean or integer array. A technical limitation of hash encoding is that multiple possible values may map to a same array offset, which is a collision that may cause some loss of information due to ambiguity.

For example, when two possible values map to a same offset that stores a Boolean that is set to hot (i.e. true), which of the two possible values was actually encoded is unclear. Furthermore, 1-hot and N-hot encoding are compatible with hash encoding. For example, there may be 1-hot or N-hot hash encoding with the following ambiguities due to a collision.

For example, encoding one or both of two possible values that hash to a same offset in a Boolean array is lossy because the following cases are indistinguishable: the first possible value was encoded, the second possible value was encoded, and both values were encoded. If an integer array is involved, a count may be stored at the shared offset such that encoding of one or two values is indeed distinguishable by count but, if the count is one, then which one is indistinguishable. In an embodiment, hash encoding is selected when a range size of possible values exceeds a threshold.

Step 303 occurs only if the ML model is a reconstructive model, which regenerates its input features as explained earlier herein. Step 303 measures respective reconstruction error for each feature vector. In an embodiment, a respective reconstruction error may be calculated for each feature as explained earlier herein, and those errors may be aggregated to calculate a total reconstruction error for a feature vector.

Various embodiments may aggregate feature errors to calculate such vector error based on summation, mean, or maximum. Because each feature vector has a respective reconstruction error, an aggregate error may likewise be calculated for a training batch, a training corpus, or a validation set. Such multi-item aggregate error may be used as a loss metric or accuracy metric for various purposes such as follows.

For example, batch error may be used as a stopping criterion for iterative training. Likewise, validation error may be used as a comparison criterion for model selection such as after preliminary or final training of a same ML model with different hyperparameters settings or different ML models of different architectures. In any case, model error for an item, a batch of items, or an entire dataset may be calculated in other ways if the ML model is not a reconstructive model.

4.0 Principal Component Analysis (PCA) for Communication Network Topology

Figure 4:
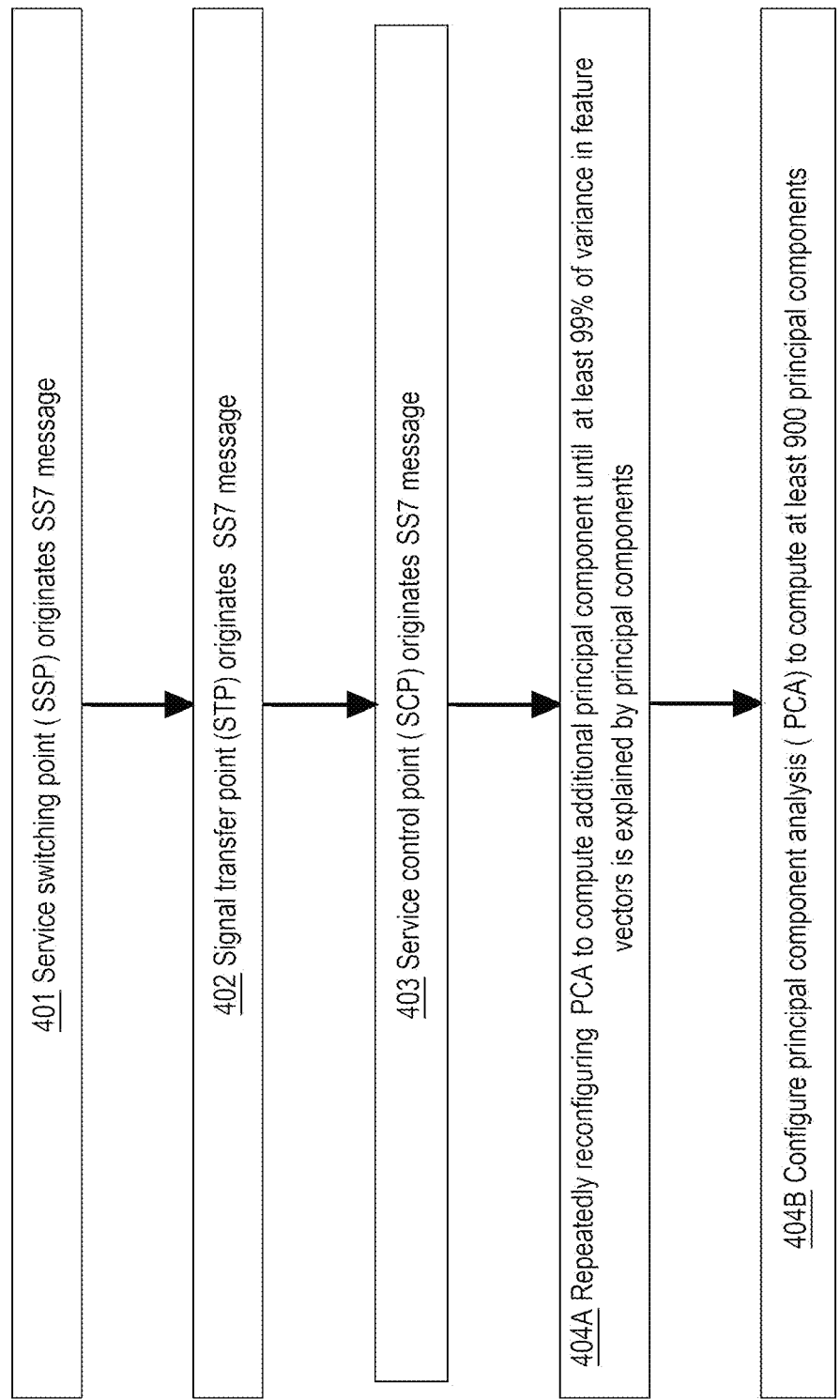
FIG. 4 is a flow diagram that depicts example computer activities for applying a principal component analysis (PCA) to control-traffic in a communication network topology.

FIG. 4 is a flow diagram that depicts example activities that a computer, such as an implementation of computer 100, may perform to apply a principal component analysis (PCA) to control-traffic in a communication network topology. PCA is an ML model that is a reconstructive model as explained earlier herein.

The process of FIG. 4 occurs in two phases that may or may not occur on separate computers and/or in separate environments. A preparatory phase that includes steps 401-403 populates a training corpus based on a communication network topology before training the PCA. The nature of steps 401-403 depend on various embodiments as follows.

In a first embodiment, SS7 messages are recorded during operation of an actual communication network. In a second embodiment, SS7 messages are recorded during simulation of a real or hypothetical communication network. In a third embodiment, SS7 messages are automatically or manually generated more or less from scratch, with or without supposing a real or hypothetical communication network.

In any case, the respective SS7 messages of steps 401-403 are different messages that originate from different respective network element types. The SS7 messages of steps 401-403 are added to a training corpus. Any or all of steps 401-403 may be repeated in variations that respectively represent anomalous or non-anomalous scenarios.

In step 401, a service switching point (SSP) originates an SS7 message that is copied into the training corpus. An SSP is a telephone exchange that participates due to physical proximity to a calling or called party. An SSP provides call control decisions and signaling, and may retrieve subscriber account information from a central office that likely is remote.

In step 402, a signal transfer point (STP) originates an SS7 message that is copied into the training corpus. An STP is a packet switch or circuit switch that is communication fabric that is likely remote and is internal to a communication route such as along a communication backbone and/or an internetwork such as for store-and-forward packet routing.

In step 403, a service control point (SCP) originates an SS7 message that is copied into the training corpus. An SCP may be in a central office and operates as a database of subscriber account metadata and content such as voicemail. By spoofing or intrusion of an STP or SSP, an attacker may steal sensitive information from an SCP. By spoofing or intrusion of an SCP, an attacker may release fake information to abuse a cooperating STP or SSP.

After steps 401-403, the training corpus is fully populated with SS7 messages that reflect various signaled interactions between diverse network elements of a rich topology. In other words, the training corpus reflects a more or less complex ecosystem having various attack injection points in the guise of various calling, called, and administrative parties. Thus, the training corpus may be used for more or less universal anomaly detection learning and not merely for learning a particular attack, attacker, victim, or involved resource.

Such a rich training corpus of diverse attacks presents a vast and multidimensional problem space that may need a sophisticated ML model such as PCA. Steps 404A-B cooperate to intensely train the PCA in a wide variety of anomalous and non-anomalous scenarios. Step 404A is repeated to incrementally improve the PCA. Step 404B may represent achieving a final state or summary after sufficiently repeating step 404A as follows.

Step 404A repeatedly and incrementally reconfigures the PCA to compute an additional principal component until at least 99% of the variance in feature vectors is explained by principal components. Feature vectors consist of features that may be more or less correlated. For example due to growth, a person's age and height and weight tend to be positively correlated, and some features may be negatively correlated or uncorrelated.

Thus, correlation (i.e. covariance) can be measured for each possible pair of two features. Each pair of features may become a principal component that is represented as a dimension in a multidimensional solution space. Each feature vector may be a point in that multidimensional solution space.

Feature pairs incrementally become principal components in a natural ordering of decreasing magnitude of covariance to maximize initial separation of feature vectors in the solution space. For example, a pair of features that are uncorrelated across all feature vectors would be added last if ever. Adding a next principal component causes a rearrangement of clusters of the feature values in the solution space.

Initially, there are few dimensions and no clusters or many small clusters. Ideally, a majority cluster emerges as non-anomalous, and remaining small cluster(s) are anomalous. Due to high dispersion and lack of clustering, the few initially added dimensions provide most of the variance that would ever occur, no matter how many principal components are later added. However, adding another principal component contributes (i.e. explains) at least a little more variance. Step 404A ceases iteratively adding principal components when explained variance exceeds a threshold such as 99%.

After step 404A ceases iterating, many principal components may have been added. Whether by iteration via step 404A or by initial configuration, step 404B configures the PCA to compute (i.e. use as dimensions) at least 900 principal components. Due to combinatorics, 900 principal components may be based on fewer than 900 features. For example, there are over a thousand pairwise combinations possible with only fifty features.

5.0 Analyzing Control-Traffic in Communication Internetwork

Figure 5:
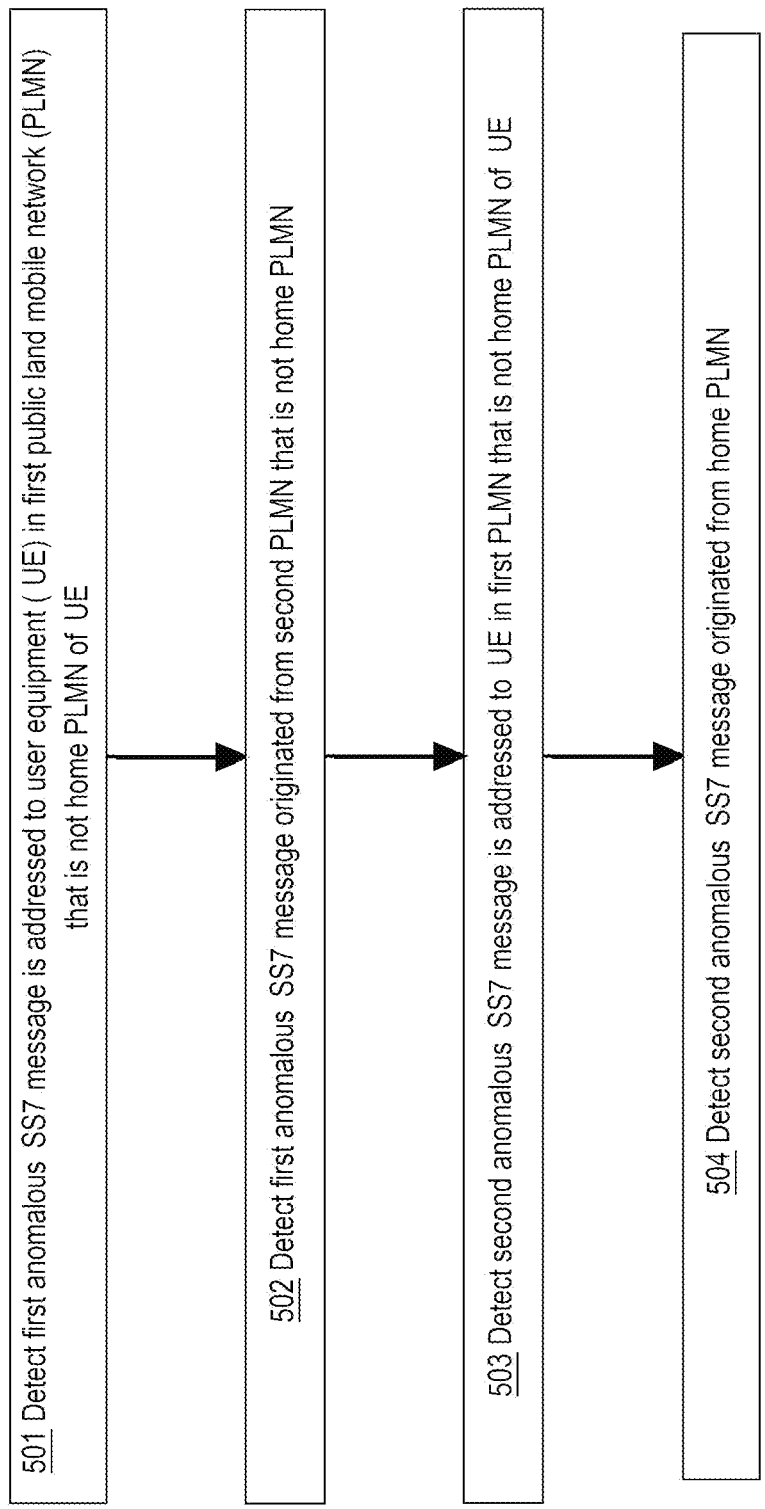
FIG. 5 is a flow diagram that depicts example computer activities for analyzing control-traffic in a communication internetwork.

FIG. 5 is a flow diagram that depicts example activities that a computer, such as an implementation of computer 100, may perform to analyze control-traffic in a communication internetwork.

Some ML architectures are rule based such as a decision tree. ML models such as neural network and PCA are not rule based. However, a neural network or PCA may match or exceed the accuracy of a decision tree. Thus, an ML model that is not rule based may nonetheless learn to implicitly behave in ways that approximate rules.

That is, rules known to human experts and unknown rules may be learned by unsupervised training. In other words, there is no need for preexisting rules at all. The only need is that a training corpus be rich enough to incidentally contain example SS7 traffic that violates a naturally implied rule that unsupervised training can automatically fit.

Naturally implied rules have two consequences. First, unsupervised training may cause an ML model to be more sensitive (i.e. smarter) than any human expert. Second, unsupervised retraining with new data may discover new rules for new attack modes before any human expert can.

The steps of FIG. 5 demonstrate learned implicit behaviors of an ML model that is not ruled based. As follows, these behaviors include implicit analysis of internetworked control-traffic that effectively approximates rules about internetwork traffic and topology.

Steps 501-502 cooperate to detect that a first SS7 message is anomalous. Steps 503-504 cooperate to detect that a second SS7 message is anomalous. The user equipment (UE) and public land mobile networks (PLMNs) of steps 501-502 may or may not be the same as in steps 503-504. Indeed the scenario of steps 501-502 is likely to be completely separate from the scenario of steps 503-504.

A UE may be a telephone or other network terminal such as a mobile station (MS). A PLMN may be a cellular network such that movement of an MS between cells of a same PLMN needs only SS7 control signaling within the PLMN. A UE has a home PLMN that administers and usually or always contains the UE. Roaming entails an MS in a PLMN that is not the home PLMN of the MS such as when the MS crosses a boundary between two PLMNs.

In one scenario with two PLMNs that are not a home PLMN of a UE that is a roaming MS, step 501 implicitly detects that an SS7 message is addressed to the UE in a first PLMN that is not the home PLMN of the UE. Step 502 implicitly detects that the SS7 message originated from a second PLMN that also is not the home PLMN of the UE. As a result of the ML model implicitly performing steps 501-502, the ML model detects that the SS7 message is anomalous.

In a different scenario, with a home PLMN of a UE that is an MS roaming in another PLMN, step 503 implicitly detects that an SS7 message is addressed to the UE in the PLMN that is not the home PLMN. Step 504 implicitly detects that the SS7 message originated from the home PLMN. As a result of the ML model implicitly performing steps 503-504, the ML model detects that the SS7 message is anomalous.

The above two scenarios are mutually exclusive internetworking patterns. Depending on the embodiment, those internetworking patterns may or may not apply to all SS7 messages. For example in various embodiments, a scenario may apply only for some operation codes that could occur in an SS7 message. In other words, the above two scenarios need not be absolute and may depend on other SS7 message fields discussed earlier herein. Such conditionality is well suited for unsupervised learning.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
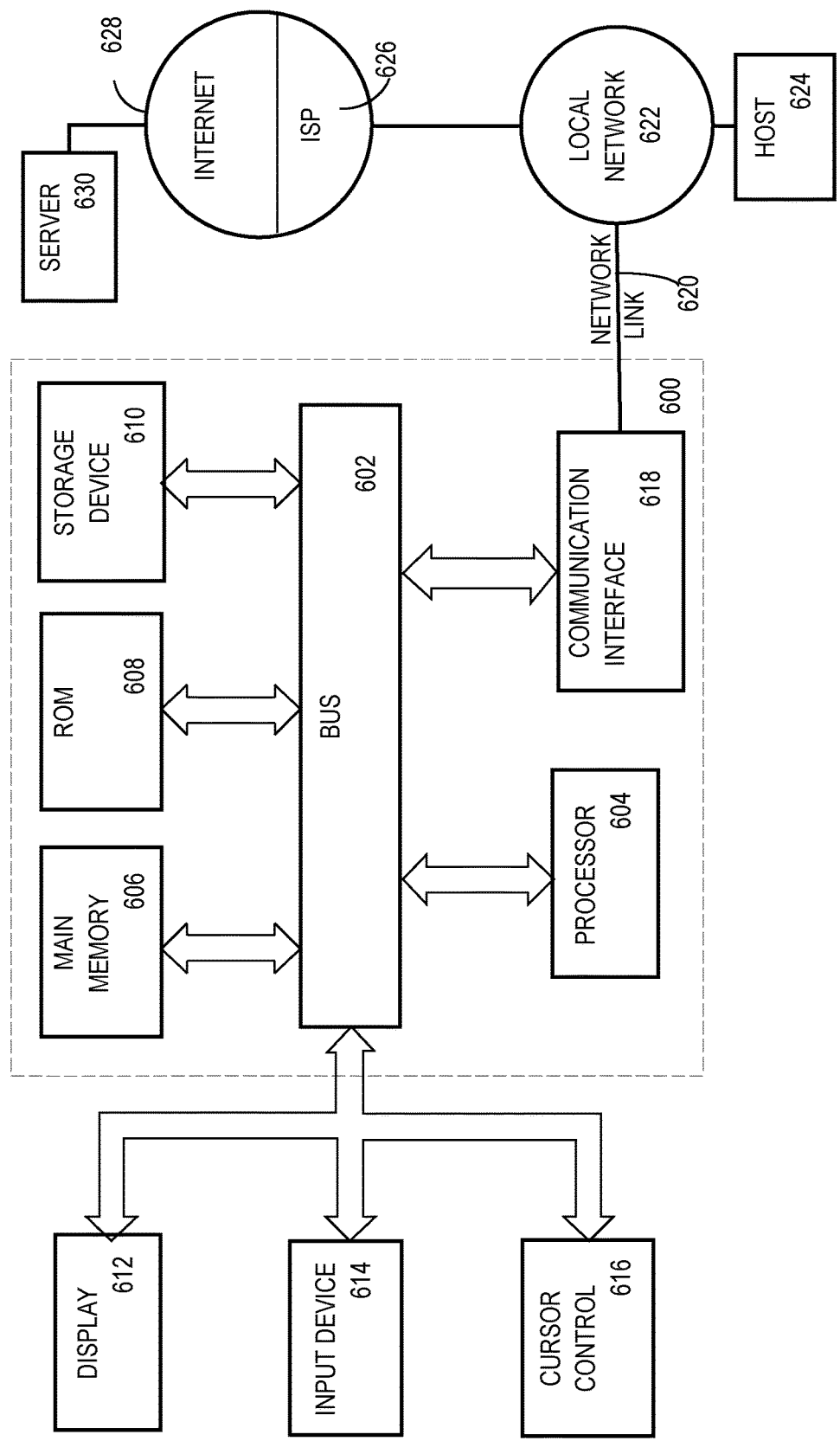
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

Software Overview

Figure 7:
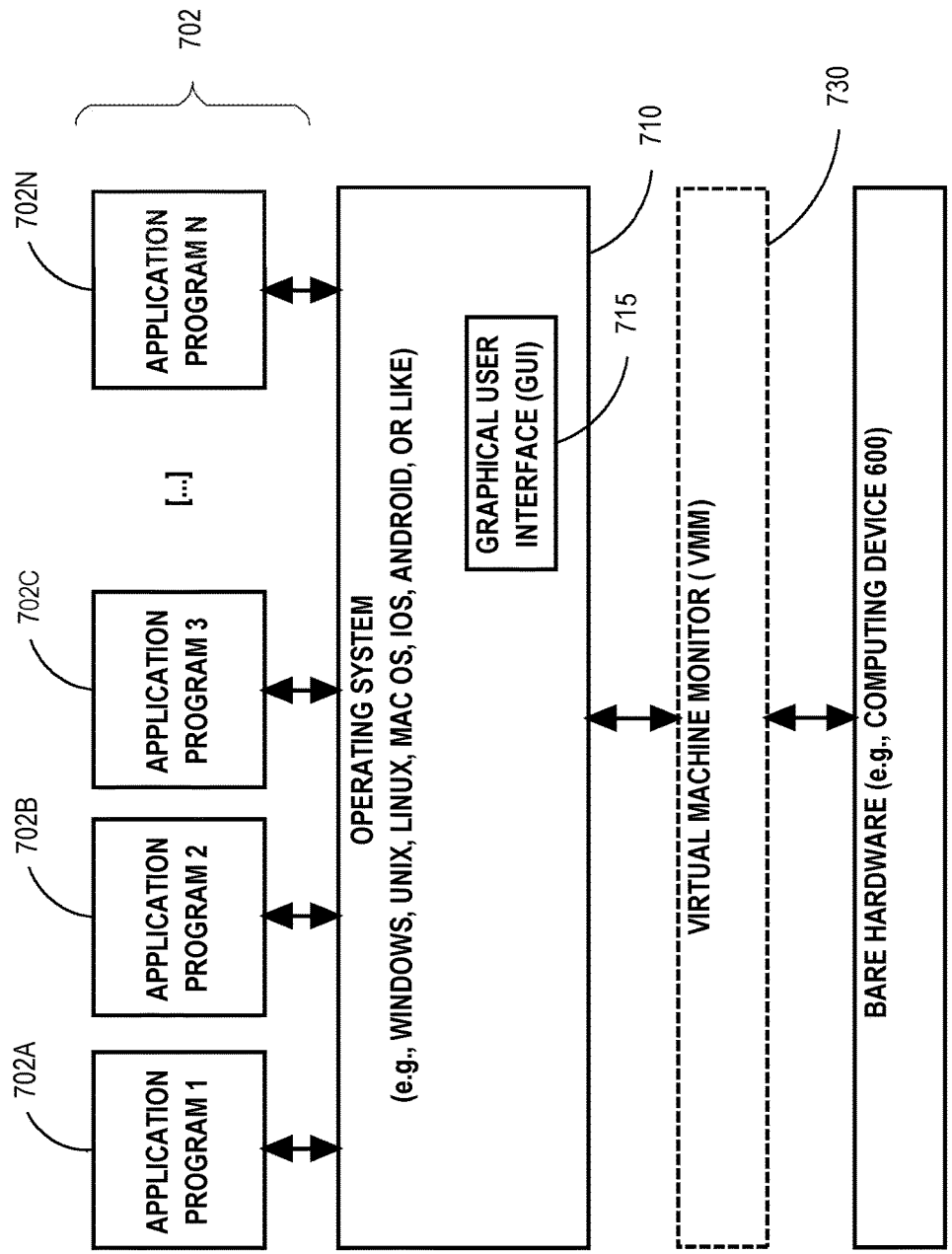
FIG. 7 is a block diagram that illustrates a basic software system that may be employed for controlling the operation of a computing system.

FIG. 7 is a block diagram of a basic software system 700 that may be employed for controlling the operation of computing system 600. Software system 700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 700 is provided for directing the operation of computing system 600. Software system 700, which may be stored in system memory (RAM) 606 and on fixed storage (e.g., hard disk or flash memory) 610, includes a kernel or operating system (OS) 710.

The OS 710 manages low-level aspects of computer operation, including managing execution of processes, memory allocation, file input and output (I/O), and device I/O. One or more application programs, represented as 702A, 702B, 702C . . . 702N, may be "loaded" (e.g., transferred from fixed storage 610 into memory 606) for execution by the system 700. The applications or other software intended for use on computer system 600 may also be stored as a set of downloadable computer-executable instructions, for example, for downloading and installation from an Internet location (e.g., a Web server, an app store, or other online service).

Software system 700 includes a graphical user interface (GUI) 715, for receiving user commands and data in a graphical (e.g., "point-and-click" or "touch gesture") fashion. These inputs, in turn, may be acted upon by the system 700 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 can execute directly on the bare hardware 720 (e.g., processor(s) 604) of computer system 600. Alternatively, a hypervisor or virtual machine monitor (VMM) 730 may be interposed between the bare hardware 720 and the OS 710. In this configuration, VMM 730 acts as a software "cushion" or virtualization layer between the OS 710 and the bare hardware 720 of the computer system 600.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system to run as if it is running on the bare hardware 720 of computer system 600 directly. In these instances, the same version of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Machine Learning Models

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, being executed, and/or generating an output or predication, a computer system process executing a machine learning algorithm applies the model artifact against the input to generate a predicted output. A computer system process executes a machine learning algorithm by executing software configured to cause execution of the algorithm. When a machine learning model is referred to as performing an action, a computer system process executes a machine learning algorithm by executing software configured to cause performance of the action.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C #, Ruby, Lua, Java, MatLab, R, and Python.

Artificial Neural Networks

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

Illustrative Data Structures for Neural Network

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L−1 to a layer L. Given the number of neurons in layer L−1 and L is N[L−1] and N[L], respectively, the dimensions of matrix W is N[L−1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer L−1 to L. An activation neuron represents an activation function for the layer that includes the activation function. An activation neuron in layer L corresponds to a row of weights in a matrix W for the edges between layer L and L−1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

Backpropagation

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as explained above.

Autoencoder

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Techniques for unsupervised training of an autoencoder for anomaly detection based on reconstruction error is taught in non-patent literature (NPL) "VARIATIONAL AUTOENCODER BASED ANOMALY DETECTION USING RECONSTRUCTION PROBABILITY", Special Lecture on IE. 2015 Dec. 27; 2(1):1-18 by Jinwon An et al.

Principal Component Analysis

Principal component analysis (PCA) provides dimensionality reduction by leveraging and organizing mathematical correlation techniques such as normalization, covariance, eigenvectors, and eigenvalues. PCA incorporates aspects of feature selection by eliminating redundant features. PCA can be used for prediction. PCA can be used in conjunction with other ML algorithms.

Random Forest

A random forest or random decision forest is an ensemble of learning approaches that construct a collection of randomly generated nodes and decision trees during a training phase. Different decision trees of a forest are constructed to be each randomly restricted to only particular subsets of feature dimensions of the data set, such as with feature bootstrap aggregating (bagging). Therefore, the decision trees gain accuracy as the decision trees grow without being forced to over fit training data as would happen if the decision trees were forced to learn all feature dimensions of the data set. A prediction may be calculated based on a mean (or other integration such as soft max) of the predictions from the different decision trees.

Random forest hyper-parameters may include: number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   storing a plurality of signaling system 7 (SS7) messages that are not labeled as anomalous, wherein each SS7 message of said plurality of SS7 messages contains an operation code;
   storing, for each SS7 message of said plurality of SS7 messages, said operation code of said SS7 message into a respective feature vector of a plurality of feature vectors that are based on said plurality of SS7 messages that are not labeled as anomalous, wherein said plurality of feature vectors contain a plurality of distinct operation codes;
   unsupervised training, based on said plurality of feature vectors that contain said plurality of distinct operation codes and that are based on said plurality of SS7 messages that are not labeled as anomalous, a machine learning (ML) model to detect an anomalous SS7 message.

2. The method of claim 1 wherein said detect said anomalous SS7 message comprises said ML model detecting:
   said anomalous SS7 message is addressed to a particular user equipment (UE) in a first public land mobile network (PLMN) that is not a home PLMN of the UE;
   said anomalous SS7 message originated from a second PLMN that is not said home PLMN.

3. The method of claim 1 wherein said detect said anomalous SS7 message comprises said ML model detecting:
   said anomalous SS7 message is addressed to a particular user equipment (UE) in a first public land mobile network (PLMN) that is not a home PLMN of the UE;
   said anomalous SS7 message originated from said home PLMN.

4. The method of claim 1 wherein said unsupervised training comprises measuring a respective reconstruction error for each feature vector of said plurality of feature vectors.

5. The method of claim 1 wherein:
   said plurality of SS7 messages contains a first SS7 message, a second SS7 message, and a third SS7 message;
   the method further comprises:
      a service switching point (SSP) originating said first SS7 message;
      a signal transfer point (STP) originating said second SS7 message;
      a service control point (SCP) originating said third SS7 message.

6. The method of claim 1 further comprising into said plurality of feature vectors, storing at least two distinct values of an SS7 field from said plurality of SS7 messages, wherein said SS7 field is selected from the group consisting of: origin point code (OPC), destination point code (DPC), called transaction type (CDTT), called numbering plan (CDNP), called nature of address indicator (CDNAI), called address (CDADDR), called country name (CDCN), called geolocation (CDLOC), calling transaction type (CGTT), calling numbering plan (CGNP), calling nature of address indicator (CGNAI), calling address (CGADDR), calling country name (CGCN), calling geolocation (CGLOC), calling transaction type (CGTT), link set (LSET), and connectionless service function (CLSF).

7. The method of claim 6 further comprising encoding multiple values of said SS7 field of said SS7 message into same said feature vector based on at least one encoding scheme selected from the group consisting of: N-hot encoding and hash encoding.

8. The method of claim 7 further comprising selecting said encoding scheme based on a cardinality of said SS7 field.

9. The method of claim 1 wherein said ML model is an autoencoder that contains at least three layers of a kind of layer selected from the group consisting of: hidden, batch normalization, activation, and dropout.

10. The method of claim 1 wherein said ML model is a principal component analysis (PCA) that is configured to compute at least 900 principal components.

11. The method of claim 1 wherein:
   said ML model is a PCA;
   the method further comprises repeatedly reconfiguring said PCA to compute an additional principal component until at least 99% of variance in said plurality of feature vectors is explained by principal components of said PCA.

12. One or more non-transitory computer-readable media storing instructions that, when executed by one or more processors, cause:

storing a plurality of signaling system 7 (SS7) messages that are not labeled as anomalous, wherein each SS7 message of said plurality of SS7 messages contains an operation code;

storing, for each SS7 message of said plurality of SS7 messages, said operation code of said SS7 message into a respective feature vector of a plurality of feature vectors that are based on said plurality of SS7 messages that are not labeled as anomalous, wherein said plurality of feature vectors contain a plurality of distinct operation codes;

unsupervised training, based on said plurality of feature vectors that contain said plurality of distinct operation codes and that are based on said plurality of SS7 messages that are not labeled as anomalous, a machine learning (ML) model to detect an anomalous SS7 message.

13. The one or more non-transitory computer-readable media of claim 12 wherein said detect said anomalous SS7 message comprises said ML model detecting:

said anomalous SS7 message is addressed to a particular user equipment (UE) in a first public land mobile network (PLMN) that is not a home PLMN of the UE;

said anomalous SS7 message originated from a second PLMN that is not said home PLMN.

14. The one or more non-transitory computer-readable media of claim 12 wherein said detect said anomalous SS7 message comprises said ML model detecting:

said anomalous SS7 message is addressed to a particular user equipment (UE) in a first public land mobile network (PLMN) that is not a home PLMN of the UE;

said anomalous SS7 message originated from said home PLMN.

15. The one or more non-transitory computer-readable media of claim 12 wherein said unsupervised training comprises measuring a respective reconstruction error for each feature vector of said plurality of feature vectors.

16. The one or more non-transitory computer-readable media of claim 12 wherein:

said plurality of SS7 messages contains a first SS7 message, a second SS7 message, and a third SS7 message;

the instructions further cause:

a service switching point (SSP) originating said first SS7 message;

a signal transfer point (STP) originating said second SS7 message;

a service control point (SCP) originating said third SS7 message.

17. The one or more non-transitory computer-readable media of claim 12 wherein the instructions further cause into said plurality of feature vectors, storing at least two distinct values of an SS7 field from said plurality of SS7 messages, wherein said SS7 field is selected from the group consisting of: origin point code (OPC), destination point code (DPC), called transaction type (CDTT), called numbering plan (CDNP), called nature of address indicator (CDNAI), called address (CDADDR), called country name (CDCN), called geolocation (CDLOC), calling transaction type (CGTT), calling numbering plan (CGNP), calling nature of address indicator (CGNAI), calling address (CGADDR), calling country name (CGCN), calling geolocation (CGLOC), calling transaction type (CGTT), link set (LSET), and connectionless service function (CLSF).

18. The one or more non-transitory computer-readable media of claim 12 wherein said ML model is an autoencoder that contains at least three layers of a kind of layer selected from the group consisting of: hidden, batch normalization, activation, and dropout.

19. The one or more non-transitory computer-readable media of claim 12 wherein said ML model is a principal component analysis (PCA) that is configured to compute at least 900 principal components.

20. The one or more non-transitory computer-readable media of claim 12 wherein:

said ML model is a PCA;

the instructions further cause repeatedly reconfiguring said PCA to compute an additional principal component until at least 99% of variance in said plurality of feature vectors is explained by principal components of said PCA.

* * * * *

UNITED STATES PATENT AND TRADEMARK OFFICE
CERTIFICATE OF CORRECTION

PATENT NO. : 11,451,670 B2
APPLICATION NO. : 17/123235
DATED : September 20, 2022
INVENTOR(S) : Ahmadi et al.

It is certified that error appears in the above-identified patent and that said Letters Patent is hereby corrected as shown below:

On the Title Page

On page 2, Column 1, under Other Publications, Line 4, delete ""Unupervised" and insert -- "Unsupervised --, therefor.

On page 2, Column 1, under Other Publications, Line 26, delete "Nural" and insert -- Neural --, therefor.

On page 3, Column 1, under Other Publications, Line 2, delete "Sequwnrial" and insert -- Sequential --, therefor.

On page 3, Column 1, under Other Publications, Line 3, delete "Communicaitons" and insert -- Communications --, therefor.

On page 3, Column 1, under Other Publications, Line 33, delete "Diffucult"," and insert -- Difficult", --, therefor.

On page 3, Column 2, under Other Publications, Line 36, delete ""Continous" and insert -- "Continuous --, therefor.

In the Drawings

On sheet 2 of 7, in FIG. 2, under Reference Numeral 201, Line 1, delete "( SS7)" and insert -- (SS7) --, therefor.

On sheet 4 of 7, in FIG. 4, under Reference Numeral 401, Line 1, delete "( SSP)" and insert -- (SSP) --, therefor.

On sheet 4 of 7, in FIG. 4, under Reference Numeral 403, Line 1, delete "( SCP)" and insert -- (SCP) --, therefor.

Signed and Sealed this
Fourteenth Day of March, 2023

Katherine Kelly Vidal
*Director of the United States Patent and Trademark Office*

CERTIFICATE OF CORRECTION (continued)
U.S. Pat. No. 11,451,670 B2

On sheet 4 of 7, in FIG. 4, under Reference Numeral 404B, Line 1, delete "( PCA)" and insert -- (PCA) --, therefor.

On sheet 5 of 7, in FIG. 5, under Reference Numeral 501, Line 1, delete "( UE)" and insert -- (UE) --, therefor.

In the Specification

In Column 8, Line 40, delete "(CLSF)" and insert -- (CLSF). --, therefor.

In Column 19, Line 38, delete "and or" and insert -- and/or --, therefor.